July 8, 1952 R. A. CUNNINGHAM 2,602,855
TELEVISION RECEIVER SQUELCHING CIRCUIT
Filed Sept. 30, 1950
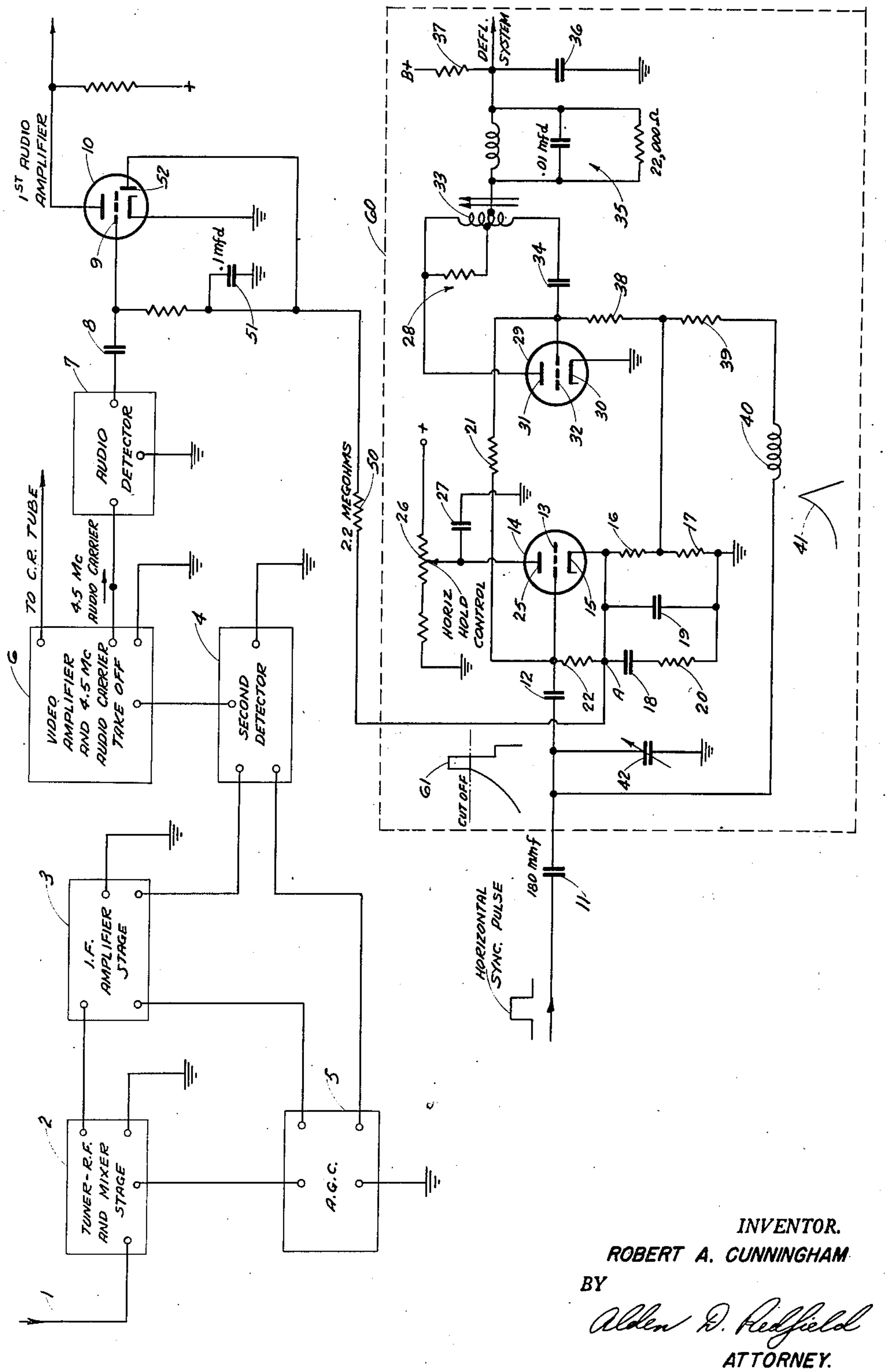
INVENTOR.
ROBERT A. CUNNINGHAM
BY
Alden D. Redfield
ATTORNEY.

Patented July 8, 1952 2,602,855

UNITED STATES PATENT OFFICE 2,602,855

TELEVISION RECEIVER SQUELCHING CIRCUIT

Robert A. Cunningham, Newport, Ky., assignor to Avco Manufacturing Corporation, Cincinnati, Ohio, a corporation of Delaware Application September 30, 1950, Serial No. 187,764

4 Claims. (Cl. 178—5.8)

This invention relates in general to television receiver circuits and more particularly to television receiver circuits which include transducer squelch circuits.

At present, out of the total thirteen television signal channels in use, only a relatively few localities can expect to have more than three or four operating channels within range. Even though the consumer does not have all of the thirteen signal channels within reach of his receiver, his standardized commercial receiver is supplied with a circuit which is capable of receiving any one of the authorized channels if they are in range of the set. The unused band through which he must tune contains a considerable amount of noise voltage, having sufficient amplitude to excite both the audio and the video transducers. As can be seen, it would be desirable to provide a circuit which is capable of eliminating or blocking out reception on any portion of the band not being used for intelligence transmission within range of the receiver.

The majority of receiver manufacturers use a channel selector-switch type of tuning system which automatically eliminates inter-channel noise, because the set is only open to reception at the fixed frequency points. These tuning units do not completely solve the above mentioned problem because they open up the receiver circuit for reception at the fixed frequency points whether there is an intelligence signal being transmitted within range or not.

There is at least one television receiver circuit, now on the market, which solves this problem by providing a particular type of audio squelch circuit. By using a considerable number of extra circuit elements, this prior art system automatically cuts out the audio transducer or speaker in the absence of a received sync pulse and cuts in the audio circuit as soon as a sync pulse is tuned in and received. Though this circuit functions as intended, it would be worth while to provide a circuit which not only cuts out the audio transducer and/or the video transducer on all undesired portions of the receiver band width, but which also keeps the transducer circuits cut out until such time as the set is adjusted to receive intelligence on a desired signal channel. In other words, it would be desirable to provide a television receiver circuit which not only squelches the receiver transducer or transducers during periods when the receiver is being tuned between signal channels but which also squelches the appropriate transducer until such time as the operator adjusts the receiver to the point where the deflection system is locked in sync with an intelligence signal being transmitted on an available operating signal channel.

Accordingly it is a basic object of the present invention to provide a television receiver transducer squelch circuit which squelches in the absence of deflection system synchronization.

It is also an object of the present invention to provide means for blanking out the cathode ray picture tube and/or the audio channel during all periods other than those in which one of the receiver deflection systems is in sync.

It is a further object of my invention to blank out the circuit feeding a television transducer while the receiver is being tuned through undesired signal channels over which television signals are being broadcast.

For a better understanding of my invention, together with other and further objects, advantages and capabilities thereof, reference is made to the following description and appended claims in connection with the accompanying drawing, in which a schematic diagram of a television receiver utilizing a squelch circuit in accordance with the invention is shown.

In practicing my invention I provide a squelch circuit which cuts out the audio and/or video transducer in the absence of deflection system synchronization. It should be noted that in my circuit the presence of sync pulses alone will not open up the amplifiers supplying the controlled transducers as it would in the above mentioned prior art system. To the contrary, synchronization between the sync pulses and a deflection circuit is required before the squelch controlled transducer is allowed to operate. I find that this circuit, though requiring very few additional elements, eliminates noise reception between operating channels, eliminates reception of garbled or distorted audio in the FM band when a continuous type tuner is used in an intercarrier sound receiver circuit and also eliminates reproduction of signals being transmitted over channels through which it is necessary to tune the receiver in order to pick up a desired channel. These results have been realized by tapping off a signal from the phase comparator circuit in the deflection system which is indicative of receiver synchronization and using this signal to cut off and turn on the audio channel transducer or picture channel transducer as desired.

In order to explain the operational details of a circuit which embodies my invention, I have shown in the drawing a major portion of an intercarrier sound type television receiver. Referring to the drawing, it will be seen that I provide an antenna, which is diagrammatically indicated as element 1. Antenna 1 is coupled through a tuner-R. F. and mixer stage 2 to an I. F. amplifier stage 3. The output of the I. F. amplifier is fed through a conventional second detector 4 to a video amplifier 6, which includes a 4.5 mc. wave-trap audio carrier take-off circuit. The output of the video amplifier is conventionally fed to the input circuit of a picture tube, not illustrated. The 4.5 mc. audio carrier in turn is fed through an audio detector 7, which of course may include a sound detector driver stage if so desired. The detected audio signal is then fed through a first audio amplifier 10 and the remainder of the audio system to finally drive an audio transducer or speaker. Element 5 constitutes a conventional AGC circuit for controlling the R. F. stage 2 and the I. F. amplifier stage 3.

Since there are many types of sync separation circuits now in current use it is not believed necessary to further complicate the illustration with this component. Regardless of the type of sync separator used, the stripped sync pulse is coupled through capacitor 11 to the input of the phase comparator in the AFC and deflection system unit 60 shown in dotted outline. Unit 60 as illustrated, is an improved version of the conventional "synchroguide" circuit and though the operation of the circuit will be hereinafter briefly explained, for an exhaustive explanation reference should be made to application No. 188,210 of Robert A. Stacey filed October 3, 1950.

The horizontal sync pulses are coupled through capacitor 11 and capacitor 12 to the grid 13 of phase comparator 14. The cathode 14 of phase comparator tube 14 is coupled through resistances 16 and 17 to ground. Capacitors 18 and 19 along with resistance 20 are connected across or in parallel with resistances 16 and 17 to form an integrating circuit. Resistances 21 and 22 form part of a biasing network supplying a negative voltage to grid 13 of phase comparator tube 14. Anode 25 is connected to the horizontal hold control 26, while bypass capacitor 27 is connected between anode 25 and ground. Blocking oscillator 28 includes a triode 29 having a cathode 30 connected to ground. The anode 31 is connected to grid 32 through a part of regenerative feedback coil 33 and capacitor 34. Tuned circuit 35 is connected between a center tap on coil 33 and the high potential side of sawtooth capacitor 36. The tuned circuit 35, the operation of which will be hereinafter more fully explained, acts as a stabilizing circuit for improving the stability of the blocking oscillator by feeding back a sine wave which is superimposed upon the grid 32 bias potential. It should be noted that the sine wave stabilizing component is here applied to an indirectly controlled or D. C. controlled blocking oscillator and not to a directly controlled blocking oscillator. Resistor 37 acts as the charging resistor for sawtooth capacitor 36.

The operational cycle of the blocking oscillator and phase comparator circuit, which is actually a horizontal AFC system, can be followed from the time power is applied if it be assumed that sweep capacitor 36 is already fully charged. Plate current flows immediately through both tubes 14 and 29 because, initially, there is no bias on the control grid of either tube. First, I will consider the blocking oscillator circuit action in discharging sweep capacitor 36. Since plate current in tube 29, which is also the discharge current of capacitor 36, flows through one half of regenerative feedback coil 33, it follows that the increase in this current from zero induces a feed-back voltage across the other half of coil 33 which is coupled to the grid circuit. The two halves of coil 33 are poled so that the above-mentioned feed-back voltage drives grid 32 positive, relative to ground, drawing grid current in tube 29 and developing a charge across capacitor 34 which is approximately equal to the voltage swing across the lower half of coil 33. As the plate current in tube 29 increases, a more positive signal voltage is induced across the lower half of coil 33 which continues to charge capacitor 34 and maintain the grid voltage at approximately zero or ground potential. It should be noted that the voltage induced across the lower half of coil 33 is dependent upon the rate of change of the flux produced by the current flowing in the upper half of coil 33. As soon as the rate of change of the expanding magnetic field decreases, because of either a saturated core effect in coil 33 or plate-current saturation in tube 29, the feed-back voltage across the lower half of coil 33 decreases in magnitude. Since the charge across capacitor 34 can not change instantaneously due to the relatively long time constant of its discharge path, the instantaneous grid voltage starts to go in a negative direction, relative to ground, thereby tending to decrease the plate current in tube 29. With this decrease in plate current the magnetic field in coil 33 collapses, inducing a voltage across the lower portion of coil 33 of opposite polarity from the feed-back voltage obtained when the plate current was increasing. This drives the grid even more negative. The effect of decreasing the plate current is thus amplified to cut-off plate current flow very rapidly, and a large negative swing of voltage is developed across the lower half of coil 33, producing a grid voltage which travels far below cut-off.

After the flow of plate current through tube 29 ceases, there is no feed-back voltage induced in the lower half of coil 33 and the grid voltage includes a bias component developed by the relatively slow discharge of capacitor 34 through resistances 38 and 17. At this point sawtooth capacitor 36 starts a charge cycle thereby developing a sawtooth sweep voltage which may be fed to the deflection system. Capacitor 34 slowly discharges raising the potential on grid 32. When grid 32 drives above cut off the complete cycle is again repeated and capacitor 36 is again discharged through triode 29.

Each time tube 29 discharges sawtooth capacitor 36, tuned circuit 35 is shock excited into violent oscillation. Thus tuned circuit is adjusted to have a natural resonant frequency which is substantially the same as the pulse repetition frequency of the horizontal sync pulses and the resulting oscillatory voltage adds a component to the bias on grid 32 having a shape such that the grid sees a sharply rising voltage wave just prior to the time grid 32 is driven above cut off. The action of the phase comparator tube and its accompanying integrating circuit will now be explained.

The grid of tube 14 is negatively biased through the action of a voltage divider which comprises resistors 21, 22 and 16. This bias is adjusted so as to normally keep the grid of the tube below cut off. The sync pulse which is fed through coupling capacitor 11 is width-modulated by a feed-back pulse taken from the junction between resistors 17 and 38. This feed-back pulse has a more or less gradual rising leading edge and a trailing edge which falls off very rapidly. Feed-back and delay coil 40 slightly delays the phase position of the feed-back pulse thereby forcing the blocking oscillator circuit to generate the feed-back pulse slightly ahead of the time position of the sync pulse. Assuming that the blocking oscillator is in sync with the horizontal sync pulse, the feed-back pulse peak arrives at the junction between capacitors 11 and 12 during the time when the horizontal sync pulse is also present at this terminal. The sharp trailing edge of the feed-back pulse, which is somewhat similar to pulse 41 shown in the illustration, cuts off the trailing edge and part of the trailing portion of the sync pulse bringing this part of the sync pulse below the cut-off potential of phase comparator tube 14. The small or narrow version of the sync pulse, which remains after the width-modulation action of feed-back pulse 42, has a shape similar to the portion of pulse 61 which is above cut-off. This part of pulse 61 drives tube 14 into conduction thereby tending to charge up both capacitors 18 and 19. Capacitor 19 charges up very rapidly, however, the relatively long time constant circuit comprising capacitor 18 and resistor 20 takes a longer period to reach its maximum charge condition. These condensers discharge through resistors 16, 17 and 20 thereby developing a relatively constant D. C. potential at the junction between resistors 16 and 17. This D. C. potential, which can be called the integrated product of the pulse width-modulated version of the horizontal sync pulse, is used to control the instantaneous frequency of the blocking oscillator.

It has already been seen that there are at least two components which make up the bias voltage applied to the grid 32 of the blocking oscillator. The first component was derived from the discharge current of capacitor 34 while the second component was derived from tuned circuit 35. It can now be seen that these two components when combined at the grid 32 form a bias potential wave which has a relatively sharp angle of attack relative to the cut off voltage point of the tube 29 just prior to the time when the wave passes through and above cut off. The third component or control component, which is tapped off of the cathode connected pulse-integrator circuit of phase comparator tube 14, adds a varying control level or base from which the rapidly rising bias potential made up of the previously mentioned two components can rise. Thus it will now be seen that the control potential supplied from the junction of resistors 16 and 17 acts to cause tube 29 to conduct earlier than usual or later than usual, whichever the case may be, thereby advancing or retarding the phase position of both the feed-back pulse 41 and the saw-tooth voltage wave generated across sweep capacitor 36. The remainder of the explanation will now be directed to a specific embodiment of my transducer squelch system which utilizes a synchronization affected signal potential taken from the above-mentioned integration circuit.

Terminal A, which is shown at the junction of resistor 22 and capacitor 18, is at a negative potential relative to ground in the absence of periodic conduction in tube 14. In other words, terminal A is negative relative to ground whenever the AFC system shown in dotted outline 60 is not in sync. When feed-back pulse 41 and the horizontal sync pulse coincide in time, thereby driving grid 13 above cut off and causing conduction in tube 14, terminal A is raised to a near zero potential level or ground potential. In fact terminal A may be driven into the positive region relative to ground during this period. Since terminal A drives strongly negative whenever the AFC system is out of sync and drives near zero or actually positive relative to ground when the AFC system is in sync, this terminal can be used to supply a signal voltage which is ideally suited for transducer squelch operation.

I will now explain how this signal voltage can be used to squelch out the audio transducer or speaker, however it is to be noted that generically this signal voltage or any other signal voltage having similar characteristics may also be used to squelch either the audio transducer or the video transducer.

Since in the illustrated embodiment I choose to show only a species of the generic concept, viz., an audio squelch circuit, I have connected terminal A through a large dropping resistor 50 to the grid of the first audio amplifier. This signal voltage at terminal A could equally as well be utilized to control either the audio detector driver stage or, as stated above, any video transducer.

When terminal A goes negative the bias voltage on grid 9 is driven below cut off, thereby cutting out the first audio amplifier as far as the audio signal is concerned. Since the first audio amplifier is thereby gated into a closed position relative to the audio signal, the audio transducer or speaker is cut out and is silent. During those periods when the horizontal sync pulse and the feed-back pulse 41 coincide and the deflection system is in sync, terminal A is driven in the positive direction, thereby moving the bias voltage on grid 9 above cut off, opening the so-called "gate" and allowing the audio signal to be amplified in the first audio amplifier and finally activate the audio transducer or speaker. It should be mentioned here that the purpose of diode 52 is to keep the grid 9 of the audio amplifier from "seeing" a squelch control voltage which goes above ground potential. This diode element can be eliminated from the circuit if a control signal is selected that has a positive peak which is fixed at ground potential or below.

The advantages of my novel circuitry should now be clear. Obviously there will be no sync pulse present when tuner element 2, which may be a continuous type tuner, is tuned between signal channels. Therefore terminal A will be strongly negative and first audio amplifier 10 will be cut off during this period. Thus the audio transducer, is squelched or silent. When the tuner unit 2 is tuned to receive a signal frequency band on which there is no operating transmitter within range of the set, then again a horizontal sync pulse will not be received, terminal A will be strongly negative and the controlled transducer will again be squelched or silent. Another advantage of my audio squelch system can now be explained.

Whenever it is desired to tune through and beyond a band which has a station transmitting thereon, in range of the receiver, the listener is obviously not interested in reproducing any of the intelligence transmitted on this channel. Recognizing this fact I have supplied a capacitor 51 which forms a time constant circuit in connection with resistor 50, capable of maintaining a bias on grid 9 for a short period. This time constant circuit does not interfere when the receiver is tuned to a desired signal channel over which a signal is being transmitted within receiver range, because the operator stops tuning at this point thereby overcoming the RC time constant circuit with a steady bias from terminal A and opening the audio amplifier system to pass audio signals.

After reading this disclosure other sources of control potential, which are indicative of synchronization or lack of synchronization in one of the deflection systems, will occur to those skilled in the art. I fully realize that it is not necessary to use a control signal which moves in the positive direction at sync. To the contrary, a control signal which moves in the negative direction at sync could be applied to the cathode circuit of one of the stages in either transducer terminated signal channel, that is, in either the audio or the video signal channel. I also fully realize that it is not necessary to directly couple a terminal in the deflection circuit to the squelch controlled stage. To the contrary, a differential voltage system may be used whereby the deflection system potential is matched against some other potential in the circuit and the control signal tapped off of the differential circuit.

While I do not desire to be limited to any specific parameters, such parameters varying in accordance with the requirements of individual designs, the following circuit values have been found to be entirely satisfactory in the specific and successful illustrated embodiment of the invention:

| | |
|---|---|
| Capacitors 8 | .01 microfarad |
| Capacitors 11 | 180 microfarads |
| Capacitors 12 | .0022 microfarad |
| Capacitors 18 | .25 microfarad |
| Capacitors 19 | .02 microfarad |
| Capacitors 27 | .05 microfarad |
| Capacitors 34 | 200 microfarads |
| Capacitors 36 | 1300 microfarads |
| Capacitors 42 | 10–160 microfarads |
| Capacitors 51 | .1 microfarad |
| Resistors 16, 17 | 150,000 ohms |
| Resistors 20 | 8,200 ohms |
| Resistors 21 | 2.7 megohms |
| Resistors 22 | 820,000 ohms |
| Resistors 38 | 100,000 ohms |
| Resistors 39 | 150,000 ohms |
| Resistors 50 | 2.2 megohms |
| Tubes 10 | 6T8 |
| Tubes 14, 29 | 6SN7GT |

While there has been shown and described what is at present considered the preferred embodiment of the present invention, it will now be obvious to those skilled in the art that various changes and modifications may be made therein without departing from the invention as defined in the appended claims.

I claim:

1. In a television receiver circuit the combination comprising a source of television signals including sync pulses and intelligence components, a signal channel stage coupled between said source of television signals and an intelligence-signal-driven transducer, said signal channel including means for opening and closing said channel to the passage of said intelligence component under the influence of a polarity changing control signal, a D.-C. controlled deflection circuit for producing periodic scanning currents and feed-back pulses having a fixed phase position relative to said periodic scanning currents, phase comparator means having an input coupled to receive said sync pulses and said feed-back pulses for producing a D.-C. deflection system control voltage of one polarity when said sync pulses are present and substantially in phase with said feed-back pulses and a D.-C. deflection control voltage of opposite polarity from said one polarity when said sync pulses are not present and not in substantial phase with said feed-back pulses, means for supplying said phase comparator with sync pulses from said source of television signals and feed-back pulses from said deflection circuit, time constant means coupling the output of said phase comparator circuit to said signal channel opening and closing means for supplying a control voltage thereto, whereby said signal channel is opened and closed in response to the changes in polarity in said phase comparator circuit output voltage.

2. In a television receiver circuit the combination comprising a source of television signals including sync pulses and intelligence components, a signal channel stage coupled between said source of television signals and an intelligence-signal-driven transducer, said signal channel including a potential biased control means for isolating said transducer from said source of television signals whenever said potential bias is changed to a given value, a D.-C. controlled deflection circuit for producing periodic scanning currents and feed-back pulses having a fixed phase position relative to said periodic scanning currents, phase comparator means having an input coupled to receive said sync pulses and said feed-back pulses for producing a D.-C. deflection system control voltage having said given value only whenever said sync pulses are not present and substantially in phase with said feed-back pulses, means for supplying said phase comparator with sync pulses from said source of television signals and feed-back pulses from said deflection circuit, means coupling the output of said phase comparator circuit to said signal channel for supplying control bias potential thereto, whereby said signal channel is opened and closed in response to the potential changes in said phase comparator circuit output voltage.

3. In a television receiver circuit the combination comprising a source of television signals including sync pulses and intelligence components, a signal channel stage coupled between said source of television signals and an intelligence-signal-driven transducer, a potential biased control means for isolating said transducer from said television signal source whenever the potential bias is changed to a second value, a D.-C. controlled deflection circuit for producing periodic scanning currents and fixed phase related feed-back pulses, phase comparator means having an input coupled to receive said sync pulses and said feed-back pulses and an output coupled to said D.-C. controlled deflection current for producing an output D.-C. deflection system control voltage of a first value whenever said sync pulses are substantially in phase with said feed-back pulses and a D.-C. deflection control voltage of said second value whenever said sync pulses are not in substantial phase with said feed-back pulses, means coupling the output of said phase comparator circuit to said signal channel isolating means for supplying a potential bias thereto, whereby said signal channel is opened and closed in response to the changes in potential in said phase comparator circuit output voltage.

4. In a television receiver circuit the combination comprising a transducer terminated signal channel including controlled gating means capable of being opened and closed under the influence of a D.-C. signal which varies between first and second values to thereby open and close said signal channel, a D.-C. controlled deflection system having feed-back pulses in phase synchronism with the scanning pulses, a source of video sync pulses, a phase comparator circuit having its input coupled to said pulse sources and its output coupled to said deflection system for providing a deflection system D.-C. control potential which varies between said first and second values in accordance with the fluctuations in phase relationship between the sync pulses and the feedback pulses, and a time delay circuit coupled between the output of said phase comparator circuit and said gate circuit, whereby said gate circuit is controlled by variations in the said deflection system D.-C. control potential.

ROBERT A. CUNNINGHAM.

REFERENCES CITED

The following references are of record in the file of this patent:

UNITED STATES PATENTS

| Number | Name | Date |
|---|---|---|
| 2,056,607 | Holmes | Oct. 6, 1936 |
| 2,137,123 | Lewis et al. | Nov. 15, 1938 |
| 2,173,173 | Lewis | Sept. 19, 1939 |
| 2,200,753 | Linsell | May 14, 1940 |
| 2,297,205 | Deserno et al. | Sept. 29, 1942 |